United States Patent
Aronowitz

(10) Patent No.: US 9,767,787 B2
(45) Date of Patent: Sep. 19, 2017

(54) ARTIFICIAL UTTERANCES FOR SPEAKER VERIFICATION

(71) Applicant: International Business Machines Corporation, Armonk, NY (US)

(72) Inventor: Hagai Aronowitz, Petah-Tikva (IL)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 14/145,938

(22) Filed: Jan. 1, 2014

(65) Prior Publication Data
US 2015/0187356 A1 Jul. 2, 2015

(51) Int. Cl.
| | | |
|---|---|---|
| G10L 17/04 | (2013.01) | |
| G10L 17/24 | (2013.01) | |
| G10L 15/02 | (2006.01) | |
| G10L 15/00 | (2013.01) | |
| G06F 21/32 | (2013.01) | |
| G10L 13/00 | (2006.01) | |
| G06N 99/00 | (2010.01) | |

(52) U.S. Cl.
CPC ............. *G10L 13/00* (2013.01); *G10L 17/04* (2013.01); *G10L 17/24* (2013.01); *G06N 99/005* (2013.01)

(58) Field of Classification Search
CPC ......... G10L 17/04; G10L 17/24; G10L 15/02; G10L 15/00; G06F 21/32
USPC ........... 704/246, 249, 260, 273, 250; 706/12
See application file for complete search history.

(56) References Cited

U.S. PATENT DOCUMENTS

| | | | | |
|---|---|---|---|---|
| 7,529,669 B2 * | 5/2009 | Ravi | ....................... | G10L 17/10 379/88.02 |
| 8,423,366 B1 * | 4/2013 | Foster | .................... | G10L 13/06 704/258 |
| 9,002,703 B1 * | 4/2015 | Crosley | ................... | G10L 15/26 704/206 |
| 2002/0013708 A1 * | 1/2002 | Walker | .................... | G10L 13/04 704/260 |
| 2006/0069567 A1 * | 3/2006 | Tischer | ................. | G10L 13/033 704/260 |

(Continued)

FOREIGN PATENT DOCUMENTS

WO 2012075641 6/2012

OTHER PUBLICATIONS

Hatch et al., "Within-class covariance normalization for SVM-based speaker recognition." Interspeech. 2006.*

(Continued)

*Primary Examiner* — Pierre-Louis Desir
*Assistant Examiner* — Seong Ah A Shin

(57) ABSTRACT

A method for speaker verification is disclosed. The method comprises using at least one hardware processor for: providing a development set comprising multiple voice samples of multiple speakers uttering a predefined development text, prompting a test text to a target speaker, wherein the test text is different from the development text, and recording a test sample of the target speaker uttering the test text, synthesizing a set of artificial voice samples based on the multiple voice samples, wherein each of the artificial voice samples simulates a different speaker of the multiple speakers uttering the test text, and verifying an identity of the target speaker based on the set of artificial voice samples and on the test sample of the target speaker.

12 Claims, 5 Drawing Sheets

(56) References Cited

U.S. PATENT DOCUMENTS

| | | | | |
|---|---|---|---|---|
| 2008/0059176 A1* | 3/2008 | Ravi | ............... | G10L 17/10 704/250 |
| 2008/0086303 A1* | 4/2008 | Sengamedu | ............ | G10L 13/00 704/231 |
| 2009/0319270 A1* | 12/2009 | Gross | ............... | G10L 15/22 704/246 |
| 2013/0132091 A1* | 5/2013 | Skerpac | ............... | G10L 17/005 704/273 |
| 2014/0379354 A1* | 12/2014 | Zhang | ............... | G10L 17/24 704/275 |
| 2015/0220716 A1* | 8/2015 | Aronowitz | ............ | G06F 21/32 706/12 |

OTHER PUBLICATIONS

Yang et al., "Detecting digital audio forgeries by checking frame offsets." Proceedings of the 10th ACM workshop on Multimedia and security. ACM, 2008.*

Aronowitz et al. "New Developments in Voice Biometrics for User Authentication." Interspeech. 2011.*

De Leon et al., "Evaluation of Speaker Verification Security and Detection of HMM-Based Synthetic Speech", IEEE, Oct. 2012.*

Akio Ogihara et al., "Discrimination Method of Synthetic Speech Using Pitch Frequency against Synthetic Speech Falsification", IEICE, Jan. 2005.*

Kinnunen et al. "Vulnerability of speaker verification systems against voice conversion spoofing attacks: The case of telephone speech." 2012 IEEE International Conference on Acoustics, Speech and Signal Processing (ICASSP). IEEE, 2012.*

Aronowitz et al., "New Developments in Voice Biometrics for User Authentication", in Proc. Interspeech, 2011.

Garcia Romero et al., "Analysis of I-vector Length Normalization in Speaker Recognition Systems," in Proceedings of Interspeech, Florence, Italy, Aug. 2011, pp. 249-252.

Smola et al., Learning with Kernels, MIT Press, Cambridge, MA, 2002.

Hatch et al., "Within-class covariance normalization for SVM-based speaker recognition," in Proc. ICSLP, 2006, pp. 1471-1474.

* cited by examiner

ARTIFICIAL UTTERANCES FOR SPEAKER VERIFICATION

BACKGROUND

The present invention relates to the field of biometric verification, and more specifically to speaker verification.

Speaker verification is often defined as the identification of the person who is speaking by characteristics of their voices (voice biometrics). Speaker verification is commonly used to authenticate or verify the identity of a speaker as part of a security process. Speaker verification processes commonly include two main phases: enrollment and verification. During enrollment, the speaker's voice is recorded and typically a number of features are extracted to form a voice print. In the verification phase, a voice, speech sample or "utterance" is compared against the previously created voice print. Speaker verification usually falls into one of two categories: text-dependent and text-independent.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method for speaker verification comprising using at least one hardware processor for: providing a development set comprising multiple voice samples of multiple speakers uttering a predefined development text; prompting a test text to a target speaker, wherein said test text is different from said development text, and recording a test sample of the target speaker uttering the test text; synthesizing a set of artificial voice samples based on said multiple voice samples, wherein each of said artificial voice samples simulates a different speaker of said multiple speakers uttering the test text; and verifying an identity of said target speaker based on said set of artificial voice samples and on said test sample of the target speaker.

There is further provided, in accordance with an embodiment, a method comprising using at least one hardware processor for: providing a development set comprising multiple voice samples of multiple speakers uttering a predefined development text; prompting a test text to a target speaker, wherein said test text is different from said development text, and recording a test sample of the target speaker uttering the test text; synthesizing a set of artificial voice samples based on said multiple voice samples, wherein each of said artificial voice samples simulates a different speaker of said multiple speakers uttering the test text; and providing said set of artificial voice samples and said test sample of the target speaker to a global phrase verification system.

There is yet further provided, in accordance with an embodiment, a system comprising: a voice recording device; an output device; a non-transitory memory unit; and at least one hardware processor operatively coupled to said output device, said voice recording device and said memory unit, wherein said at least one hardware processor is configured for: providing a development set stored on said memory unit, said development set comprising multiple voice samples of multiple speakers uttering a predefined development text; prompting a test text to a target speaker by said output device, wherein said test text is different from said development text, and recording a test sample of the target speaker uttering the test text by said recording device; synthesizing a set of artificial voice samples based on said multiple voice samples, wherein each of said artificial voice samples simulates a different speaker of said multiple speakers uttering the test text; and providing said set of artificial voice samples and said test sample of the target speaker to a global phrase verification system.

In some embodiments, the method further comprises using said at least one hardware processor for: recording a reference sample of the target speaker uttering a reference text, said reference text is different from said test text; and synthesizing an artificial reference sample based on said reference sample, wherein said artificial reference sample simulates the target speaker uttering the test text, wherein verifying an identity of said target speaker is further based on said artificial reference sample.

In some embodiments, the method further comprises using said at least one hardware processor for: recording a reference sample of the target speaker uttering a reference text, wherein said reference text is identical to said test text, and wherein the verifying of the identity of said target speaker is further based on said reference sample.

In some embodiments, said method further comprises using said at least one hardware processor for: recording a reference sample of the target speaker uttering a reference text, said reference text comprising two or more phrases; selecting said test text to be one or more phrases of said two or more phrases; and synthesizing an artificial reference sample based on said reference sample, wherein said artificial reference sample simulates the target speaker uttering the test text, wherein the verifying of the identity of said target speaker is further based on said artificial reference sample. In some embodiments, said synthesizing comprises text splicing.

In some embodiments, said text splicing comprises de-weighing the boundaries between spliced segments of the text.

In some embodiments, said de-weighing comprises utilizing a rule-based decision.

In some embodiments, said de-weighing is based on a comparison between voice samples of said multiple voice samples of said development set before and after being spliced.

In some embodiments, said global phrase verification system is utilized for verifying an identity of said target speaker based on said set of artificial voice samples and said test sample of the target speaker.

In some embodiments, said at least one hardware processor is further configured for: recording a reference sample of the target speaker uttering a reference text by said recording device, said reference text is different from said test text; and synthesizing an artificial reference sample based on said reference sample, wherein said artificial reference sample simulates the target speaker uttering the test text, wherein said verifying said identity of said target speaker is further based on said artificial reference sample.

In some embodiments, said at least one hardware processor is further configured for: recording a reference sample of the target speaker uttering a reference text by said recording device, wherein said reference text is identical to said test text, and wherein said verifying of said identity of said target speaker is further based on said reference sample.

In some embodiments said at least one hardware processor is further configured for: recording a reference sample of the target speaker uttering a reference text by said recording device, wherein said reference text comprises two or more phrases; selecting said test text to be one or more phrases of said two or more phrases; synthesizing an artificial reference sample based on said reference sample, wherein said artificial reference sample simulates the target speaker uttering the test text, and wherein the verifying of the identity of said target speaker is further based on said artificial reference sample.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
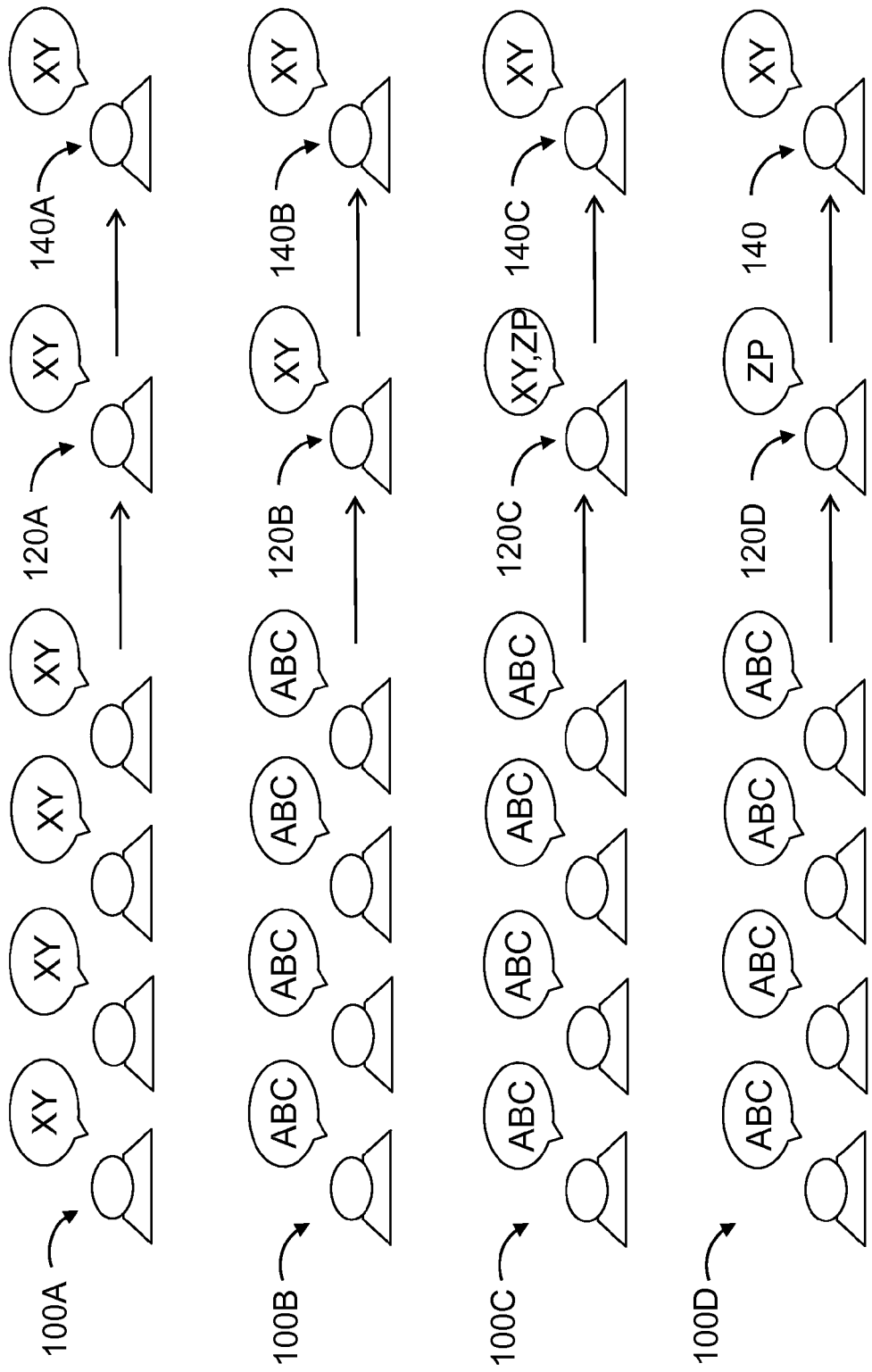
FIG. 1 shows a schematic illustration of exemplary scenarios of text-dependent speaker verification to which the present technique may be applied.

The disclosed technique provides artificial utterances which simulate a speaker uttering a selected text, and may be used for speaker verification. The disclosed technique further provides actual speaker verification. The disclosed technique may be embodied as methods, systems or computer program products. Text-dependent verification relies, inter-alia, on text resemblance between a reference uttered text and a voice print to be verified. It is advantageous to apply the disclosed technique to text-dependent speaker verification scenarios, particularly in cases where some of the speaker samples include utterances of different texts (i.e., not identical), hence making the verification process more difficult. In such cases, the disclosed technique may be utilized to replace some of the speaker samples with artificial speaker samples of a specific text, and such that all of the speaker samples involved in the verification process will be of the same text.

The term "text", as referred to herein, may include one or more words, symbols, digits, or a combination thereof, which are affixed in any type of medium.

The term "phrase", as referred to herein, may include one or more portions of a text, up to the entirety of that text.

The term "included" and its derivations, as referred to herein with respect to a text, phrase, word, symbol, digits or a combination thereof, refers to inclusion of the text, phrase, word, symbol, digit or a combination thereof as it is, inter alia, in the same sequence. For example, "XYZ" includes "XY" but does not include "XZ", where each of "X", "Y" or "Z" may represent one or more phrases, words, symbols, digits or a combination thereof. Unless indicated otherwise, the term "included" and its derivations, with respect to two or more texts, phrases, words, symbols, digits or combinations thereof may refer to two or more identical such texts, phrases, words, symbols, digits or combinations thereof.

A client of a verification process may be, for example, a bank or a factory, which requires verification of identities of its customers or employees accordingly (will be also referred to herein as "users"). A text-dependent verification process, for the purpose of the present invention, may be characterized as including three phases: a preliminary phase, an enrollment phase and a verification phase.

At a first or preliminary phase, a universal background model is generated or provided and used in order to establish a verification process or system. The universal background model is commonly used as a contrast to the test samples of the specific speakers to be verified and to differentiate between the speakers. Furthermore, it is commonly used in the classification of the test samples in the verification phase. The universal background model may generally include a development set. The development set may include multiple voice samples of multiple speakers uttering a predefined text, which will be referred to herein below as "development text".

At a second phase, which is generally known as the enrollment phase, a voice sample of a target speaker, i.e., the speaker to be verified, is obtained. The voice sample, which will be referred to herein below as "reference sample", is generally obtained by recording the target speaker uttering another text. This text will be referred to herein below as "reference text".

At a third phase, which is generally known as the verification phase, a voice sample of the target speaker is obtained when verification of the target speaker is desired. The voice sample, which will be referred to herein below as "test sample", is generally obtained by recording the target speaker uttering a further text. This text will be referred to herein below as "test text". A verification of the target speaker is then performed, commonly in real time, by comparing the test sample to the reference sample. The comparison is generally performed based on the development set. Since the verification is text-dependent, a resemblance between the uttered texts in the different phases is highly significant and even essential. A great resemblance, sameness at most, allows for more feasible and accurate verification.

The extent of resemblance between the texts in the different phases (i.e., the development text, the reference text and the test text) will be described herein below by using the terms "identical", "included" or "different". Some terms may have different meanings in different contexts, as follows. The present invention generally addresses verification scenarios in which the text test is different from the development text. By "different" in this context it is meant that the test text is not identical to the development text. But the development text may or may not include the test text and vice versa. The different verification scenarios that the disclosed technique may be applied to may be generally distinguished by their test text and reference text extent of resemblance. By "different" in this context it is meant that the test text is not identical to the reference text and is not included in the reference text. However, the reference text may be included in the test text.

Reference is now made to FIG. 1, which shows a schematic illustration of exemplary scenarios of text-dependent speaker verification, to which the present technique may be applied. FIG. 1 illustrates four such different scenarios and the different phases of voice verification on each scenario. Each of numerals 100A, 100B, 100C and 100D represent a development set which includes multiple speakers (only four are shown for the sake of illustration) uttering a development text. Each of numerals 120A, 120B, 120C and 120D, represents a reference sample of a target speaker uttering a reference text in an enrollment phase. Each of numerals 140A, 140B, 140C and 140D, represents a test sample of each of the target speakers uttering a test text in a verification phase. Each one of the letters used to indicate the uttered text, e.g., "A", "B" or "X", may represent one or more phrases, words, symbols, digits or a combination thereof.

In the first scenario, a development set 100A is provided, which includes recorded voice samples of multiple speakers uttering a development text indicated as "XY". A reference sample 120A is obtained by recording a target speaker uttering a reference text indicated as "XY". A test sample 140A is obtained by recording the target speaker uttering a test text indicated as "XY". As one can see, on this scenario, the development text, the reference text and the test text are identical. Such scenario may conform, for example, with a global passphrase type of speaker verification. In such verification, the test text (i.e., the passphrase) is a global phrase, indicated in FIG. 1 as "XY". A global phrase is generally used in each phase, each time a target speaker is verified (will be referred to herein as "verification session") and for all of the target speakers (also referred herein as users) relating to a specific client (e.g., customers of a specific bank or employees of a specific company). Thus, the test text is fixed at least per a specific client. It should be noted that FIG. 1 illustrates each scenario for only one exemplary target speaker.

A global passphrase speaker verification allows for a relatively feasible and accurate verification. Nonetheless, it also allows for a more feasible identity theft and therefore provides less secure verification. In addition, it is most likely that the global passphrase would change from one client to the other, thus, requiring generation of a separate development set for each desired global passphrase. In such a case, it would be most advantageous if a single development set may be used for global passphrase verification of variety of global passphrases and therefore variety of clients. Such a case may conform to the following second scenario, where an identical reference and test texts, but a different development text, are used.

In the second scenario, a development set 100B is provided, including recorded voice samples of multiple speakers uttering a development text indicated as "ABC". A reference sample 120B is obtained by recording a target speaker uttering a reference text indicated as "XY". A test sample 140B is obtained by recording the target speaker uttering a test text indicated as "XY". As one can see, in this scenario, the test text is different from the development text and identical to the reference text.

Such a scenario may conform, for example, to a user-selected passphrase type of speaker verification or when using a single development set on variety of global passphrase clients as described herein above. In a user-selected passphrase speaker verification, each target speaker (or user) selects a personal passphrase. The reference text and the test text for each target speaker are then determined to be his selected passphrase. The test text is therefore fixed per a specific target speaker. In such a case, for each client there are multiple test texts selected by the client's users. Hence, at least some of the test texts would be most probably different from the development text. User-selected passphrase verification is more secure, for example with respect to global passphrase verification, but suffers from degraded accuracy due to the fact that the development text is different from the test text.

According to the disclosed technique, in such a scenario, an artificial development set may be synthesized for each target speaker based on the development set. Each artificial development set may simulate the speakers uttering the selected test text of the specific target speaker. As a result, a global passphrase verification may be performed for verifying an identity of each target speaker based on the corresponding artificial development set, his reference sample and his test sample, as all relate now to the same text. Thus, a relatively more feasible and accurate text-dependent verification may be performed while using a development set which relates to a different text (i.e., different from the test text).

In the third scenario, a development set 100C is provided, which includes recorded voice samples of multiple speakers uttering a development text indicated as "ABC". A reference sample 120C is obtained by recording a target speaker uttering a reference text indicated as "XY,ZP". A test sample 140C is obtained by recording the target speaker uttering a test text indicated as "XY". As one can see, in this scenario, the test text is different from the development text and included in the reference text.

Such a scenario may conform, for example, with text-prompted speaker verification type. In text-prompted speaker verification, a target speaker is recorded at the enrollment phase uttering a reference text which includes multiple phrases (i.e., two or more) and at the verification phase, one or more phrases from the multiple phrases are selected to be the test text. This selection of a test text may be performed in each verification session. For example, reference sample 120C includes two phrases indicated as: "XY" and "ZP". At an exemplary verification session, the test text was selected to be "XY" and a test sample 140C was recorded accordingly. Text-prompted verification is more secure, for example with respect to global passphrase verification, but suffers from degraded accuracy due to the fact that the test text is different from the development text and is included in, and usually not identical to the reference text.

According to the disclosed technique, in such a scenario, artificial development sets may be synthesized for one or more phrases of the multiple phrases or for selected test texts. The artificial development sets may simulate the speakers uttering one or more phrases of the reference text or selected test texts. In addition, artificial reference samples may be synthesized for one or more phrases of the multiple phrases or for selected test texts. The artificial development sets may simulate the target speaker uttering one or more phrases of the reference text or selected test texts. As a result, a global passphrase verification may be performed for verifying an identity of a target speaker based on the corresponding artificial development set (i.e., corresponding to the selected test text), the corresponding artificial reference sample (i.e., corresponding to the selected test text) and his test sample, as all relate now to the same text. Thus, a relatively more feasible and accurate text-dependent verification is performed and with a better security, since the reference text is not identical to the test text and the text test is not fixed per a target speaker.

In the forth scenario, a development set 100D is provided, which includes recorded voice samples of multiple speakers uttering a development text indicated as "ABC". A reference sample 120D is obtained by recording a target speaker uttering a reference text indicated as "ZP". A test sample 140D is obtained by recording the target speaker uttering a test text indicated as "XY". As one can see, in this scenario, the test text is different from the development text and from the reference text.

Such a scenario may conform, for example, with a random-prompted type of speaker verification. In a random-prompted speaker verification, a randomly selected test text is prompted in each verification session and therefore is most likely different from the reference text and from the development text. Random-prompted verification is more secured, for example with respect to global passphrase verification, but suffers from degraded accuracy due to the fact that the development text and the reference text are different from the test text.

According to the disclosed technique, in such a scenario, an artificial development set may be synthesized for each randomly selected test text based on the development set. Each artificial development set may simulate the speakers uttering the randomly selected test text. In addition, an artificial reference sample may be synthesized for each randomly selected test text based on the reference sample. Each artificial reference sample may simulate the target speaker uttering the randomly selected test text based on the reference sample. As a result, a global passphrase speaker verification may be performed for verifying an identity of a target speaker based on the corresponding artificial development set, the corresponding artificial reference sample (i.e., both corresponding to the randomly selected test text) and his test sample, as all relate now to the same text. Thus, a relatively more feasible and accurate text-dependent verification is performed and with a high-level of security, since the test text is different from the reference text and is randomly selected.

Figure 2A:
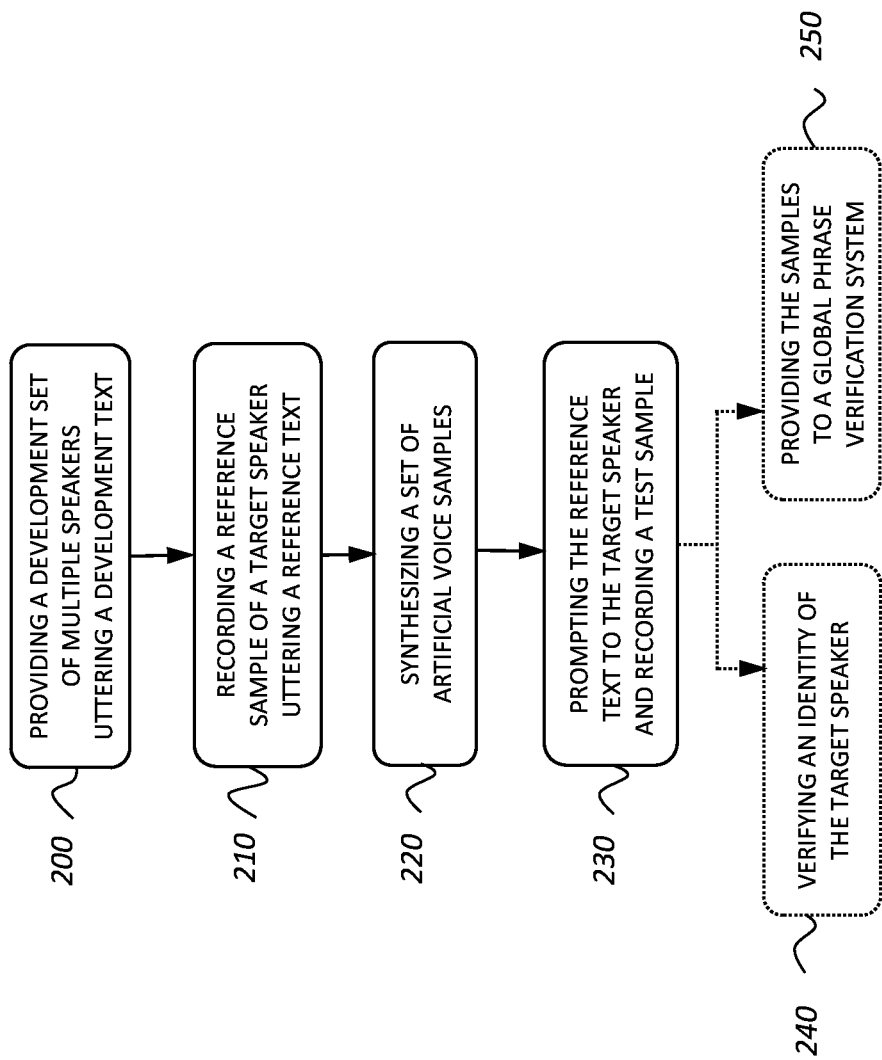
FIG. 2A shows a flowchart of a method, constructed and operative in accordance with an embodiment of the disclosed technique.

Reference is now made to FIG. 2A, which shows a flowchart of a method, constructed and operative in accordance with an embodiment of the disclosed technique. This method utilizes a test text which is fixed per a target speaker, different from the development text and identical to the reference text. Therefore, this method may be used in the second scenario shown in FIG. 1. In a step 200, a development set is provided. The development set includes multiple voice samples of multiple speakers uttering a predefined development text. For example, development set 100B of FIG. 1 includes multiple voice samples of multiple speakers (only four are shown) uttering the predefined development text indicated as "ABC".

In a step 210, a reference sample of a target speaker uttering a reference text is recorded. For example, recording reference sample 120B of FIG. 1 of a target speaker uttering a reference text indicated as "XY". Commonly, there are multiple target speakers per a client and each is recorded uttering a reference text. The reference text may be identical for all of the target speakers of a specific client or at least some of the reference texts may be different. If a user-selected passphrase type of a speaker verification is applied, then each target speaker selects or being allotted with a different personal passphrase. The passphrase is used as a fixed test text per a target speaker. In such a case, the reference text is determined to be, for each target speaker, his personal passphrase.

In a step 220, a set of artificial voice samples is synthesized based on the multiple voice samples of the development set. The voice samples are synthesized such that each of the artificial voice samples simulates a different speaker of the multiple speakers uttering the test text. For example, with respect to FIG. 1, a set of artificial voice samples may be synthesized based on development set 100B such that each artificial voice sample simulates each of the speakers uttering "XY" instead of "ABC" as in development set 100B.

In a step 230, when a verification session is initiated for a target speaker, a test text is prompted to the target speaker, which is, in the present method, the reference text. A test sample of the target speaker uttering the reference text is then recorded. The test (or reference) text is different from the development text. For example, recording test sample 140B of FIG. 1 of a target speaker uttering a test text indicated as "XY", which is identical to the reference text of reference sample 120B.

In a step 240, an identity of the target speaker is verified based on the set of artificial voice samples, the reference sample and the test sample. Since all three samples (i.e., development, reference and test) relate to the same text, the verification may be performed according to global passphrase verification methods, as known in the art.

In an alternative step to step 240, step 250, the set of artificial voice samples, the reference sample and the test sample of the target speaker are provided to a global passphrase verification system, as known in the art. The global passphrase verification system is then utilized for verifying an identity of the target speaker based on the provided samples.

Figure 2B:
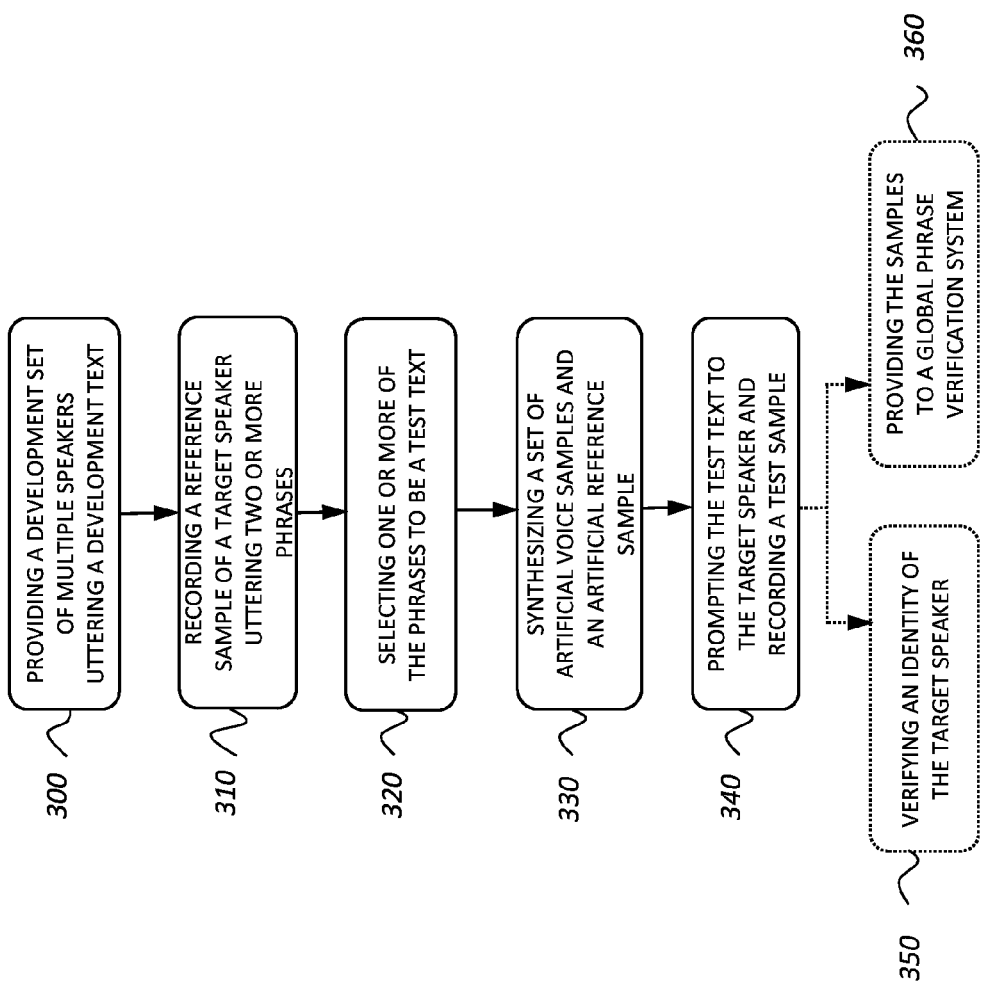
FIG. 2B shows a flowchart of another method, constructed and operative in accordance with another embodiment of the disclosed technique.

Reference is now made to FIG. 2B, which shows a flowchart of another method, constructed and operative in accordance with another embodiment of the disclosed technique. This method utilizes a test text which is not fixed, i.e., at least per a target speaker, and which is different from the development text and included in the reference text. Therefore, this method may be used in the third scenario shown in FIG. 1. In a step 300, a development set is provided. The development set includes multiple voice samples of multiple speakers uttering a predefined development text. For example, development set 100C of FIG. 1 includes multiple voice samples of multiple speakers (only four are shown) uttering the predefined development text indicated as "ABC".

In a step 310, a reference sample of a target speaker uttering a reference text is recorded. The reference text includes two or more phrases. For example, recording reference sample 120C of FIG. 1 of a target speaker uttering a reference text indicated as "XY,ZP". The reference text includes two phrases indicated as: "XY" and "ZP". The reference text may be common for all of the target speakers of a single client or reference texts of at least some of the target speakers may be different.

In a step 320, the test text is selected to be one or more phrases of the two or more phrases of the reference text. Thus, in each verification session, a different one or more phrases may be selected resulting in a non-identical (i.e., with respect to the reference text) and non-fixed test text which provides better security. For example, with reference to FIG. 1, third scenario, the reference text includes two phrases "XY" and "ZP". The test text may be selected to be "XY", "ZP" or "XY,ZP". The test text as shown in FIG. 1 was selected to be "XY". The selection may be generally performed offline, i.e., in advance, for the next one or more verification sessions. Alternatively, such selection may be performed online and once a verification session is initiated.

In a step 330, a set of artificial voice samples is synthesized based on the multiple voice samples of the development set. The voice samples are synthesized such that each of the artificial voice samples simulates a different speaker of the multiple speakers uttering the test text. For example, with respect to FIG. 1, a set of artificial voice samples may be synthesized based on development set 100C such that each artificial voice sample simulates each of the speakers uttering the text indicated as "XY" instead of "ABC" as in development set 100C. Furthermore, an artificial reference sample is synthesized based on the reference sample such that the artificial reference sample simulates the target speaker uttering the test text. For example, with respect to FIG. 1, an artificial reference sample may be synthesized based on reference sample 120C such that the reference sample simulates the target speaker uttering the text indicated as "XY" instead of "XYZP" as in reference sample 120C.

The synthesis of the artificial development set and of the artificial reference sample may be generally performed offline, following an offline selection of a text test (as described in step 320) and for each such selected test text. Alternatively, since the options for selecting a test text are finite, a synthesis may be performed offline for each such option. In case the selection is performed online, the synthesis may be also performed online after a text test selection is performed.

In a step 340, when a verification session is initiated for a target speaker, the selected test text is prompted to the target speaker. A test sample of the target speaker uttering the prompted test text is then recorded. For example, recording test sample 140C of FIG. 1 of the target speaker uttering a test text which is selected to be the phrase "XY".

In a step 350, an identity of the target speaker is verified based on the set of artificial voice samples, the artificial reference sample and the test sample. Since all three samples (i.e., development, reference and test) relate to the same text, the verification may be performed according to global passphrase verification methods, as known in the art.

In an alternative step to step 350, step 360, the set of artificial voice samples, the artificial reference sample and the test sample of the target speaker may be provided to a global phrase verification system, as known in the art. The global passphrase verification system is then utilized for verifying an identity of the target speaker based on the provided samples.

Figure 2C:
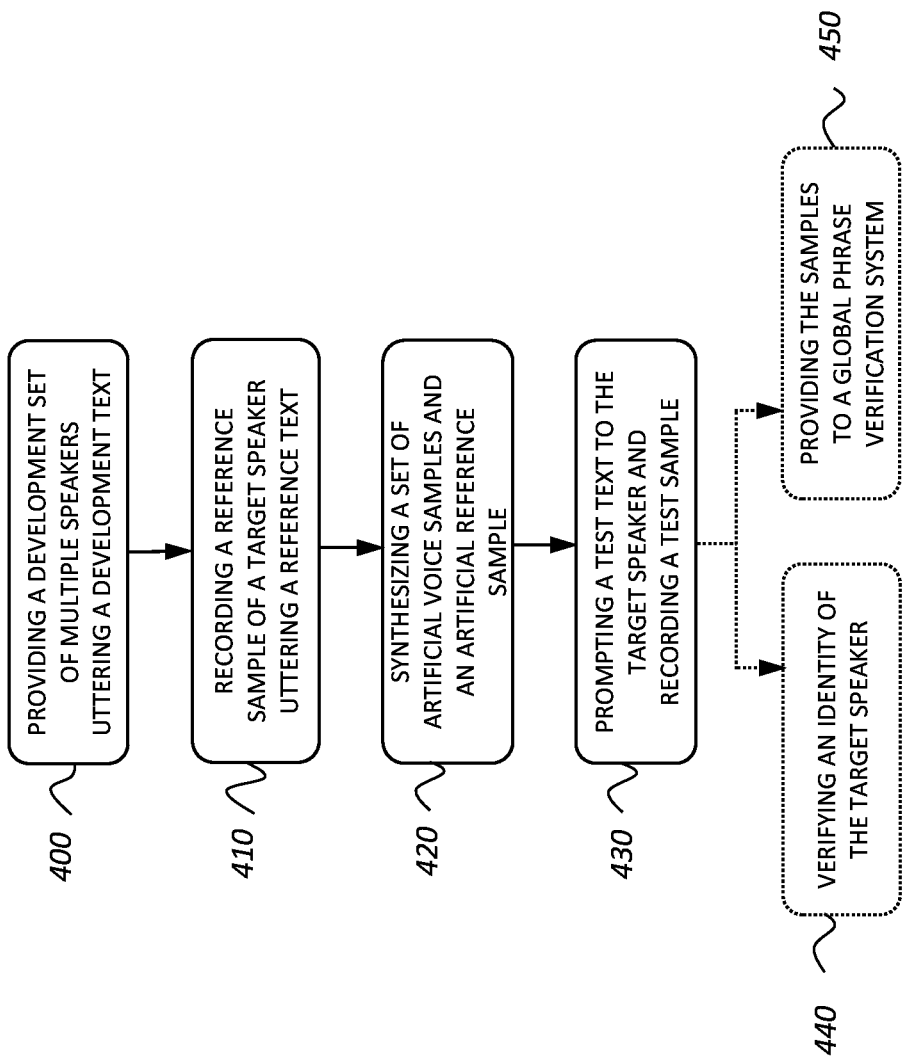
FIG. 2C shows a flowchart of a further method, constructed and operative in accordance with a further embodiment of the disclosed technique.

Reference is now made to FIG. 2C, which shows a flowchart of a further method, constructed and operative in accordance with a further embodiment of the disclosed technique. This method utilizes a random test text, which is different from the development text and from the reference text. Therefore, this method may be used in the forth scenario shown in FIG. 1. In a step 400, a development set is provided. The development set includes multiple voice samples of multiple speakers uttering a predefined development text. For example, development set 100D of FIG. 1 includes multiple voice samples of multiple speakers (only four are shown) uttering the predefined development text indicated as "ABC".

In a step 410, a reference sample of a target speaker uttering a reference text is recorded. For example, recording reference sample 120D of FIG. 1 of a target speaker uttering a reference text indicated as "ZP". The reference text may be common for all of the target speakers of at least a single client or reference texts of at least some of the target speakers may be different.

In a step 420, a set of artificial voice samples is synthesized based on the multiple voice samples of the development set. The voice samples are synthesized such that each of the artificial voice samples simulates a different speaker of the multiple speakers uttering a test text, which is different from the development text. Furthermore, an artificial reference sample is synthesized based on the reference sample such that the artificial reference sample simulate the target speaker uttering the test text, since it is also different from the reference text.

The synthesis of the artificial development set and of the artificial reference sample may be generally performed offline, following an offline random selection of a text test, and for each such randomly selected test text. Alternatively, the random selection of the text test and following that the synthesis of the artificial development set and of the artificial reference sample may be performed online.

For example, with respect to FIG. 1, in the forth scenario, the test text was selected to be "XY". Therefore, a set of artificial voice samples may be synthesized based on development set 100D such that each artificial voice sample simulates each of the speakers uttering the text indicated as "XY" instead of "ABC" as in development set 100D. Furthermore, an artificial reference sample may be synthesized based on reference sample 120D such that the reference sample simulates the target speaker uttering the text indicated as "XY" instead of "ZP" as in reference sample 120D.

In a step 430, when a verification session is initiated for a target speaker, a randomly selected test text is prompted to the target speaker. A test sample of the target speaker uttering the prompted randomly selected test text is then recorded. For example, recording test sample 140D of FIG. 1 of the target speaker uttering the test text which was randomly selected to be "XY".

The random selection of the test text may be performed, for example, by randomly selecting a text from a database comprising a collection of texts. A test text may be randomly selected for a specific target speaker or for a group of target speakers. Each randomly selected test text may be used in only one verification session per a target speaker or may be reused in further verification sessions of the same target speaker. However, it is not recommended to use the same test text in sequential verification sessions for the same target speaker from security considerations.

In a step 440, an identity of the target speaker is verified based on the set of artificial voice samples, the artificial reference sample and the test sample. Since all three samples (i.e., development, reference and test) relate to the same text, the verification may be performed according to global passphrase verification methods, as known in the art.

In an alternative step to step 440, step 450, the set of artificial voice samples, the artificial reference sample and the test sample of the target speaker may be provided to a global phrase verification system, as known in the art. The global passphrase verification system is then utilized for verifying an identity of the target speaker based on the provided samples.

Figure 3:
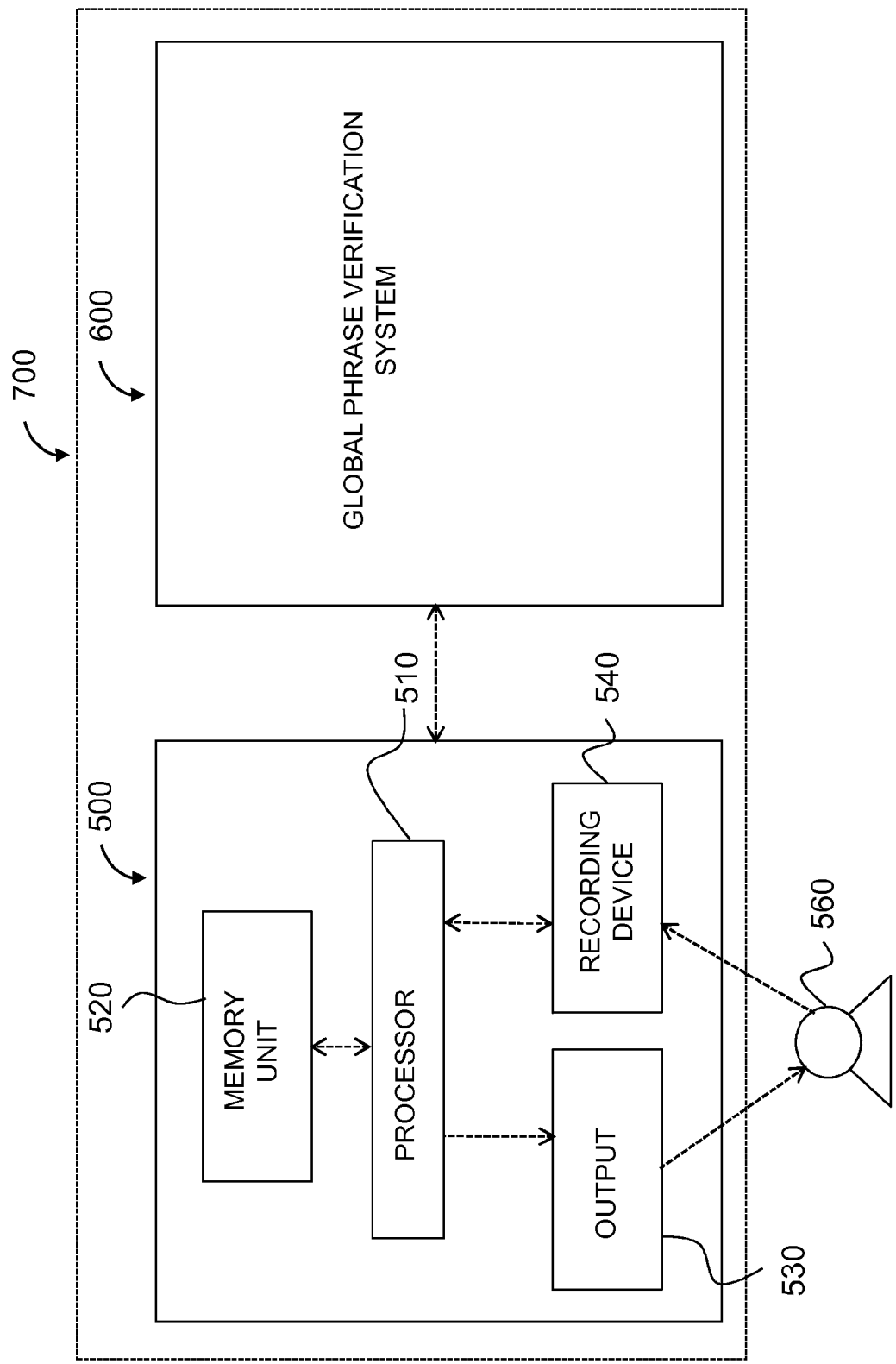
FIG. 3 shows a schematic illustration a system, constructed and operative in accordance with yet another embodiment of the disclosed technique.

Reference is now made to FIG. 3, which shows a schematic illustration of a system, constructed and operative in accordance with yet another embodiment of the disclosed technique. A system 500 according to the disclosed technique may include a hardware processor 510, a memory unit 520, an output device 530 and a recording device 540. Memory unit 520, output device 530 and recording device 540 are operatively coupled with processor 510. A system 600 is a global passphrase verification system, as known in the art. System 500 is connected to system 600. System 500 and system 600 may be two separate systems or may form a unified speaker verification system 700. System 500, system 600 and system 700 may generally operate in accordance with the methods of FIGS. 2A, 2B and 2C.

System 500 is designated to provide system 600 with a development set, and a target speaker reference sample and test sample, which relate to the same text, i.e., equivalent to a global passphrase. The development set, the reference sample and the test sample relating to the same text may be used by system 600 to verify an identity of the target speaker.

A development set, a reference sample of a target speaker and a test text for next verification session of the target speaker, for example a target speaker 560, may be each provided to or may be each generated by system 500. The development set, the reference sample and the test text may be stored in memory unit 520. A target speaker 560 may approach system 500 and request to identify himself System 500 may display to target speaker 560 the test text by output device 530. Recording device 540 then records target speaker 560 uttering the test text. Processor 510 may store the recording in memory unit 520 as a test sample of target speaker 560.

System 500 may further synthesize an artificial development set and in addition, an artificial reference sample, in case the reference text is not identical to the test text, in accordance with the disclosed technique. System 500 then provides system 600 with the artificial development set, the reference sample or the artificial reference sample, if such is required, and the test sample. System 600 may exploit machine learning techniques such as NAP, LDA, PLDA, JFA, HMM-supervector, SVM etc. to train a classifier based on the artificial development set and the reference (or artificial reference) sample. The classifier may be then used to match the test sample to the reference (or artificial reference) sample, according to known global passphrase verification techniques, and provide a positive or negative verification notice (i.e., an identity of the target speaker is verified or not accordingly). The verification notice may be transferred to system 500 and provided to target speaker 560 by output device 530.

System 500 may be also utilized to generate a development set at the preliminary phase of the speaker verification process or to generate a reference sample in the enrollment phase. The generation of a reference sample is similar to the generation of a test sample as described herein above. In such a case the target speaker is requested to utter the reference text. The generation of a development set is also similar to the generation of a test sample. However, in such a case, multiple speakers are recorded, each at a time, uttering the development text.

Memory unit 520 may be a non-volatile storage unit as known in the art. Output device 530 may be, for example, a display and/or a loudspeaker. Recording device 540 may be, for example, a microphone device. System 500 may be connected with system 600 in a wired or wireless connection. System 600 may be remotely located with respect to system 500 and may communicate with system 550 over the internet. The development set, the reference sample and the test text may be generated externally to system 500 or system 700 and stored in memory unit 520. Alternatively, the development set, the reference sample or the test text may be transferred to system 500 in real time.

The text synthesis according to the disclosed technique may be performed by using synthesis approaches as known in the art and such as text splicing or Voice Transformation (VT) (see for example: Stylianou, Yannis. "*Voice transformation: a survey.*" Acoustics, Speech and Signal Processing, 2009. ICASSP 2009. IEEE International Conference on IEEE, 2009) or Text To Speech (TTS) (see for example: J. Yamagishi, T. Kobayashi, Y. Nakano, K. Ogata, J. Isogai, "*Analysis of Speaker Adaptation Algorithms for HMM-Based Speech Synthesis and a Constrained SMAPLR Adaptation Algorithm*", Audio, Speech, and Language Processing, IEEE Transactions on, Vol. 17, No. 1. (January 2009), pp. 66-83) or a combination thereof. Text splicing may be used, for example, in the case the test text is included in the development text (but not identical), for generating the artificial development set, or in case it is included in the reference text (but not identical), for generating the artificial reference sample. Splicing may be also used, for example, in case all of the content of the test text is included in the development or reference text but not sequentially or not in the same order (e.g., as "XY" is included in "XAY" or as "AB" is included in "BAC"). Furthermore splicing may be used in case a portion of the text test (e.g., one or more words, syllables or digits) is included in the development text or in the reference text, but then an additional synthesis method would be required, such as STT . . . VT and TTS may be used, for example, in case adequate audio is not available for splicing.

As co-articulation may cause the splicing to sound less natural in the boundaries between spliced segments of a text, the disclosed technique may account for that by de-weighting the spliced text boundaries. For example, a boundary, which sounds less natural, may be given less weight in the verification process. More generally, the disclosed technique may account for the less natural boundaries by applying some transform such as Within-Class Covariance Normalization (WCCN) (see, for example: A. O. Hatch, S. Kajarekar and A. Stolcke, "*Within-class covariance normalization for SVM-based speaker recognition*" in Proc. ICSLP, 2006, pp. 1471-1474), on the boundaries. The transform may be applied on the boundaries while utilizing some rule-based decision (e.g., assigning a weight which equals zero for each boundary) or by learning the weights explicitly from the development set, e.g., by comparing spliced phrases and non-spliced phrases (i.e., genuine ones) from the development set and assessing automatically the nature of articulation.

Global passphrase verification methods and systems, as known in the art, which may be utilized by the disclosed technique or may utilize the disclosed technique may be, for example, Nuisance Attribute Projection (NAP) systems or Probabilistic Linear Discriminant Analysis (PLDA) systems (see: Hagai Aronowitz, "Text Dependent Speaker Verification Using a Small Development Set", http://www.superlectures.com/odyssey2012/text-dependent-speaker-verification-using-a-small-development-set).

Generally, a development text according to the disclosed technique is designated to be used by a synthesis process to simulate utterances of a variety of test texts. It is advantageous then, to predefine the development text such that it would facilitate such a broad use. For example, for test texts that include words, it would be advantageous to predefine a development text to include combination of words that would provide a variety of syllables. If the test texts include numbers, then it would be advantageous to predefine the development text to include a combination of all of the digits (i.e., 0, 1, 2, 3, 4, 5, 6, 7, 8 and 9). A development set according to the disclosed technique may be provided or may be generated by the disclosed technique.

It should be noted that according to the disclosed technique, and due to the greater flexibility and diversity it allows, only a relation between the reference text and the test text of a target speaker may be defined. Thus, different target speakers of a single client may select or may be allotted with different reference texts and/or different test texts. For example, with reference to FIG. 1, in the third scenario, a target speaker may be allotted with reference text 120C, i.e., "XYZP" and test text 140C, i.e., "XY". Another target speaker of the same client, may select or be allotted with a reference text "ABZP" and a test text "ZP". Both target speakers comply with the requirement that the test text of a target speaker is included in his reference text.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a hardware processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for speaker verification comprising using at least one hardware processor for:
   providing a development set comprising multiple human voice samples of multiple human speakers uttering a predefined development text;
   recording, using a microphone, a reference sample of a target speaker uttering a reference text;
   prompting, using an output device selected from the group consisting of a loudspeaker and a display, a test text to the target speaker, wherein said test text and said reference text are different from said predefined development text, and wherein said prompting is performed after said reference sample recording;
   recording, using a microphone, a test sample of the target speaker uttering the test text;
   synthesizing a set of simulated human voice samples based on said multiple human voice samples, wherein each of said simulated human voice samples simulates a different human speaker of said multiple human speakers uttering the test text, wherein said synthesizing comprises text splicing;
   computing a universal background model from said synthesized simulated human voice samples; and
   verifying an identity of said target speaker based on said universal background model and on said reference sample and test sample of the target speaker.

2. The method of claim 1, wherein said reference text is different from said test text, and wherein the method further comprises using said at least one hardware processor for:
   synthesizing a simulated reference sample based on said reference sample, wherein said simulated reference sample simulates the target speaker uttering the test text,
   wherein the verifying of the identity of said target speaker is further based on said simulated reference sample.

3. The method of claim 1, wherein said reference text is identical to said test text.

4. The method of claim 1, wherein said reference text comprises two or more phrases, and wherein the method further comprises using said at least one hardware processor for:
   selecting said test text to be one or more phrases of said two or more phrases; and
   synthesizing a simulated reference sample based on said reference sample, wherein said simulated reference sample simulates the target speaker uttering the test text,
   wherein the verifying of the identity of said target speaker is further based on said simulated reference sample.

5. The method of claim 1, wherein said text splicing comprises de-weighing boundaries between spliced segments of the text.

6. The method of claim 5, wherein said de-weighing comprises utilizing a rule-based decision.

7. The method of claim 5, wherein said de-weighing is based on a comparison between voice samples of said multiple human voice samples of said development set before and after being spliced.

8. A system for speaker verification, the system comprising:
   a voice recording device;
   an output device;
   a non-transitory memory unit; and
   at least one hardware processor operatively coupled to said output device, said voice recording device and said memory unit, wherein said at least one hardware processor is configured for:
   providing a development set stored on said memory unit, said development set comprising multiple human voice samples of multiple human speakers uttering a predefined development text;
   recording, using a voice recording device, a reference sample of a target speaker uttering a reference text;
   prompting, using said output device, a test text to a target speaker by said output device, wherein said test text and said reference text are different from said predefined development text, and wherein said prompting is performed after said reference sample recording;
   recording, using a voice recording device, a test sample of the target speaker uttering the test text;
   synthesizing a set of simulated human voice samples based on said multiple human voice samples, wherein each of said simulated human voice samples simulates a different human speaker of said multiple human speakers uttering the test text, wherein said synthesizing comprises text splicing;
   computing a universal background model from said synthesized simulated human voice samples; and
   verifying an identity of said target speaker based on said universal background model and on said reference sample and test sample of the target speaker.

9. The system of claim 8, wherein said reference text is different from said test text, and wherein said at least one hardware processor is further configured for:
   synthesizing a simulated reference sample based on said reference sample, wherein said simulated reference sample simulates the target speaker uttering the test text; and
   providing said simulated reference sample to said global phrase verification system,
   wherein said verifying said identity of said target speaker is further based on said simulated reference sample.

10. The system of claim 8, wherein said reference text is identical to said test text.

11. The system of claim 8, wherein said reference sample comprises a recording of the target speaker uttering two or more phrases, and wherein said at least one hardware processor is further configured for:
   selecting said test text to be one or more phrases of said two or more phrases;
   synthesizing a simulated reference sample based on said reference sample, wherein said simulated reference sample simulates the target speaker uttering the test text; and
   providing said simulated reference sample to said global phrase verification system,
   wherein the verifying of the identity of said target speaker is further based on said simulated reference sample.

12. The system of claim 8, wherein said text splicing comprises de-weighing boundaries between spliced segments of the text.

* * * * *